United States Patent [19]

Hegarty et al.

[11] Patent Number: 5,137,550
[45] Date of Patent: Aug. 11, 1992

[54] CASCADE ACID GAS REMOVAL PROCESS

[75] Inventors: William P. Hegarty; Thomas C. Bono, both of Allentown, Pa.

[73] Assignee: Air Products and Chemicals, Inc., Allentown, Pa.

[21] Appl. No.: 691,929

[22] Filed: Apr. 26, 1991

[51] Int. Cl.$^5$ .............................................. B01D 47/00
[52] U.S. Cl. ........................................ 55/43; 55/48; 55/55; 55/73; 423/220
[58] Field of Search ............... 55/73, 68, 48, 43, 55; 423/220

[56] References Cited

U.S. PATENT DOCUMENTS

| | | | |
|---|---|---|---|
| 3,531,917 | 10/1970 | Grunewald | 55/73 |
| 4,414,004 | 11/1983 | Wagner et al. | 55/73 |
| 4,824,452 | 4/1989 | Grunewald et al. | 62/17 |
| 4,999,031 | 3/1991 | Gerhardt et al. | 55/73 |

*Primary Examiner*—Bernard Nozick
*Attorney, Agent, or Firm*—Robert J. Wolff; James C. Simmons; William F. Marsh

[57] ABSTRACT

The present invention relates to an improvement to a process for the removal of acid gases from a feed stream containing acid gases in which the feed gas is cooled and countercurrently contacted with a liquid absorbent in an absorber tower and the spent absorbent is regenerated by distillation wherein dissolved acid gases are stripped from the spent absorbent thereby producing a regenerated liquid absorbent and recycled to the absorber tower.

The improvement, which is for the production of a product which is essentially free of sulfur containing compounds and has a reduced concentration of carbon dioxide, comprises the following steps: (a) compressing the acid gas-lean product gas to an elevated pressure and cooling the resultant compressed portion; (b) countercurrently contacting the elevated pressure, cooled, acid gas-lean product gas of step (a) and the regenerated liquid absorbent in a second absorber, thereby producing the product, which is essentially free of sulfur containing compounds and has a reduced concentration of carbon dioxide, at the top of the second absorber and a partially spent absorbent at the bottom of the second absorber, wherein said second absorber is operated at a higher pressure than the operating pressure of said absorber tower; (c) recovering the product, which is sulfur containing compounds and has a reduced concentration of carbon dioxide; and (d) using the partially spent absorbent to contact with the feed gas in the absorber tower.

3 Claims, 3 Drawing Sheets

FIG. I
*PRIOR ART*

CASCADE ACID GAS REMOVAL PROCESS

TECHNICAL FIELD

The present invention relates to a process for the selective removal of acid gases and other sulfur containing compounds from a feed stream using a physical solvent to absorb the acid gases.

BACKGROUND OF THE INVENTION

Numerous absorption processes using a physical solvent are known in the art for the selective removal of acid gases such as carbon dioxide, hydrogen sulfide and other sulfur containing compounds such as carbonyl sulfide from a feed stream containing such components. The process depicted in FIG. 1 is representative of these. The term "physical solvent" means an absorbent which absorbs the selected component from the feed gas stream by physical characteristics and not by means of a chemical reaction. The term "absorbent" as used herein and in the claims shall mean a physical solvent. For ease of description, the terms "acid gas" or "acid gases" as used herein and in the claims shall include in its meaning other sulfur containing compounds, in addition to the two classic acid gases, hydrogen sulfide and carbon dioxide.

SUMMARY OF THE INVENTION

The present invention relates to an improvement to a process for the removal of acid gases from a feed stream containing acid gases. In the process, the feed gas is cooled and countercurrently contacted with a liquid absorbent in an absorber tower thereby absorbing at least a portion of the acid gases into the liquid absorbent producing an acid gas-lean product gas at the top and spent absorbent at the bottom. The spent absorbent is regenerated by distillation wherein dissolved acid gases are stripped from the spent absorbent thereby producing a regenerated liquid absorbent. The regenerated liquid absorbent is recycled to the absorber tower.

The improvement, which is for the production of a product which is essentially free of sulfur containing compounds and has a reduced concentration of carbon dioxide, comprises the following steps: (a) compressing at least a portion of the acid gas-lean product gas to an elevated pressure and cooling the resultant compressed portion; (b) countercurrently contacting the elevated pressure, cooled, acid gas-lean product gas portion of step (a) and the regenerated liquid absorbent in a second absorber, thereby producing the product, which is essentially free of sulfur containing compounds and has a reduced concentration of carbon dioxide, at the top of the second absorber and a partially spent absorbent at the bottom of the second absorber, wherein said second absorber is operated at a higher pressure than the operating pressure of said absorber tower; (c) recovering the product, which is essentially free of sulfur containing compounds and has a reduced concentration of carbon dioxide; and (d) using the partially spent absorbent to contact with the feed gas in the absorber tower.

The process of the present invention can further comprise flashing the partially spent absorbent of step (b) to liberate dissolved carbon dioxide, and then phase separating the warmed, flashed partially spent absorbent to remove the liberated carbon dioxide, thereby leaving a low-carbon-dioxide-content, partially spent absorbent to be used in step (d). This embodiment can further comprise phase separating the partially spent absorbent prior to flashing to remove any acid gas-lean syngas entrained in the partially spent absorbent and recycling the removed, acid-gas lean syngas to the absorber tower.

DETAILED DESCRIPTION OF THE INVENTION

The process of the present invention is best understood in light of the prior art. In a conventional coal gasifier combined cycle facility, synthesis gas (syngas) is produced by the gasification of coal using any of the known gasifier technologies. This syngas is then combusted and the combustion products expanded in a turbine for the production of electrical power. Unfortunately, with the use of most coals, i.e., those containing sulfur, this syngas cannot be fed directly to the turbine but must be cleaned to remove acid gases which cause air pollution. The typical way of removing these acid gases is with an absorption process which uses a selective physical solvent.

Figure 1:
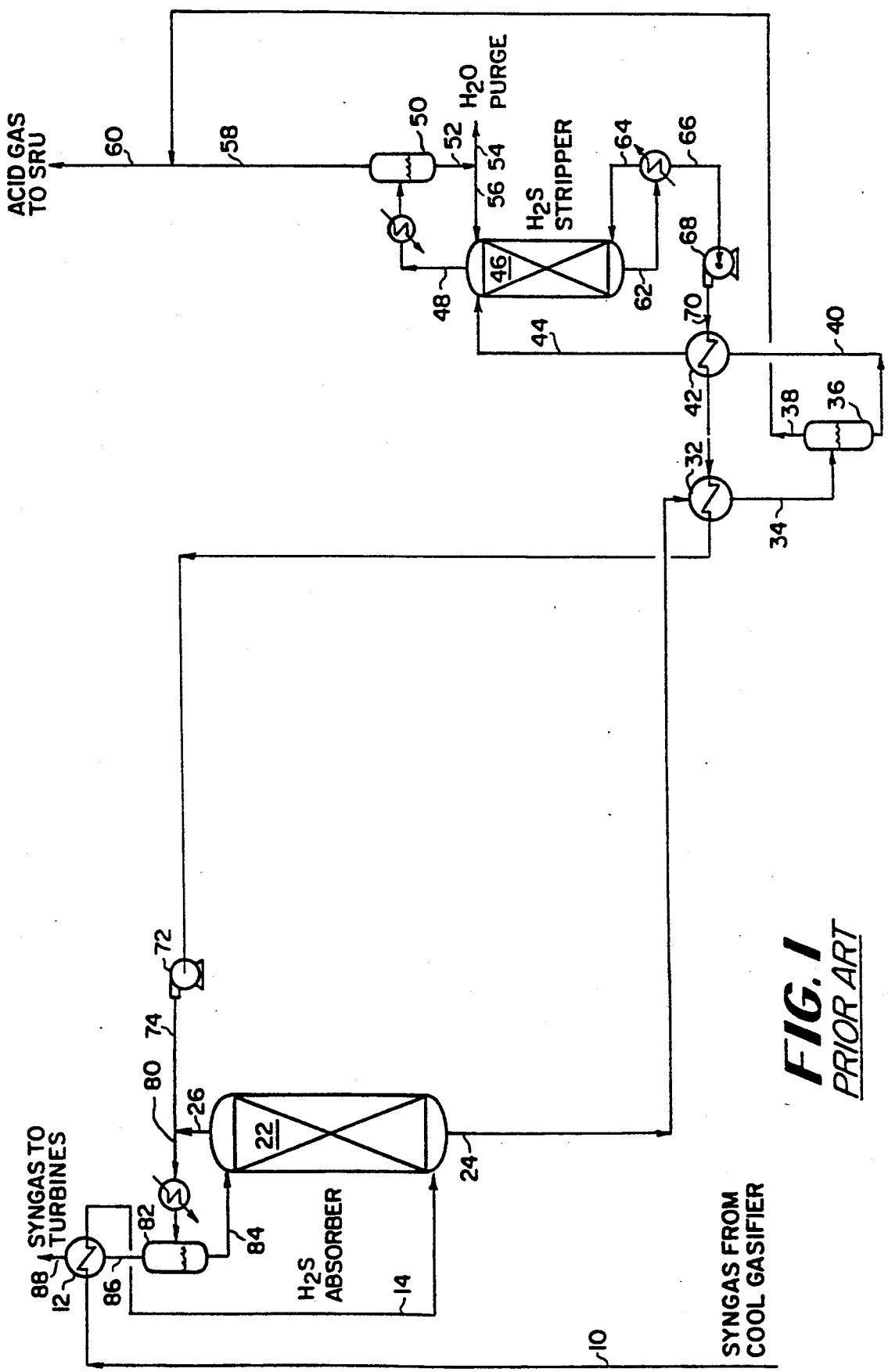
FIG. 1 is a schematic of the absorber process known in the prior art.

A conventional process for removal of acid gas from a synthesis gas (syngas) stream produced by a coal gasifier using absorption is shown in FIG. 1. With reference to this FIG. 1, the syngas stream, line 10, is cooled in heat exchanger 12 against warming cleaned product gas. This cooled syngas is fed, via line 14, into the bottom of absorber tower 22 wherein it is countercurrently contacted with absorbent descending the tower thus selectively removing acid gases, e.g., most of the hydrogen sulfide, about twenty percent (20%) of the carbon dioxide and about fifty percent (50%) of the carbonyl sulfide.

The spent absorbent from absorber 22, is removed, via line 24, reduced in pressure (flashed), warmed in heat exchanger 32 against cooling regenerated absorbent and fed, via line 34, to phase separator 36. The liquid from separator 36 is further warmed in heat exchanger 42 against warming regenerated absorbent and fed, via line 44, to stripper 46 for the stripping of the acid gases from the absorbent, thereby regenerating the absorbent.

The overhead from stripper 46 is removed, via line 48, cooled thereby partially condensing a portion of the overhead. This partially condensed is then phase separated in separator 50. This vapor overhead, line 58, and combined with the overhead from separator 36, line 38, into a process stream to be sent to a sulfur recovery unit, via line 60.

The liquid from separator 50, line 52, is returned to the top of stripper 46 as liquid reflux, via line 56. In order to prevent a build up of water in the absorbent, a small purge stream can be removed, via line 54, from this liquid stream, line 52.

The regenerated absorbent is removed, via line 62, from the bottom of stripper 46. In order to provide vapor boilup to stripper 46, a portion of the regenerated absorbent, line 62, is removed, via line 64, and returned to the bottom of stripper 46. The remaining portion, line 66, is pumped to pressure with pump 68, cooled in heat exchangers 42 and 32 and then further pumped to pressure with pump 72.

This pressurized regenerated absorbent, line 74, is admixed with the acid gas-lean syngas, line 26, from the top of absorber 22 to presaturate the absorbent with carbon dioxide to minimize the temperature increase associated with the carbon dioxide absorption. This combined stream, line 80 is cooled and the phase separated in separator 82. The liquid from separator 82 is fed, via line 84, to the top of absorber 22 as the absorbent.

The vapor overhead from separator 82 is removed, via line 86, warmed in heat exchanger 12 and removed as acid gas-lean syngas product, via line 88. This acid gas-lean syngas product is environmentally suitable to be sent to the combustion turbines for the generation of electrical power.

From two to five percent (2-5%) of the acid gas in a syngas is typically carbonyl sulfide with the balance being hydrogen sulfide and carbon dioxide. The absorbents used for selective desulfurization such as methanol, n-methyl pyrolydone and the alkyl ethers of polyethylene glycol have hydrogen sulfide solubilities about eight (8) times as high as carbon dioxide solubility. When absorbent flow is set to absorb essentially all the hydrogen sulfide, about twenty percent (20%) of the carbon dioxide is co-absorbed. The absorption of carbonyl sulfide, which has a solubility intermediate to hydrogen sulfide and carbon dioxide solubilities, is about fifty percent (50%). Therefore, about ninety seven to ninety nine percent (97-99%) of the total sulfur is therefore absorbed and about eighty percent (80%) of the carbon dioxide is retained in the syngas. If the absorbent flow is increased to absorb the remainder of the carbonyl sulfide, then excessive quantities of carbon dioxide are coabsorbed. It is advantageous to retain the carbon dioxide in the syngas so that when the pressurized syngas is fed to the turbine, power will be generated as a result of the extra flow of carbon dioxide through the turbine. Additionally, this retention of carbon dioxide in the syngas minimizes carbon dioxide dilution of sulfur containing acid gas stream to the sulfur recovery unit.

Unfortunately, where a liquid fuels plant, such as a liquid phase methanol plant, or any other chemical process is incorporated into the coal gasifier combined cycle, the acid gas-lean syngas produced by the above described conventional absorption process is not suitable to be used as feed for such a liquid fuels plant. Typically, the level of sulfur present in the acid gas-lean syngas will poison most commercial methanol or other synthesis catalysts. Also, it may be desirable to reduce the levels of carbon dioxide for efficiency reasons. Therefore, an additional level of purification is required. The present invention is an improvement to the above described conventional process for this further purification. The improvement of the present invention is shown in FIG. 2.

Figure 2:
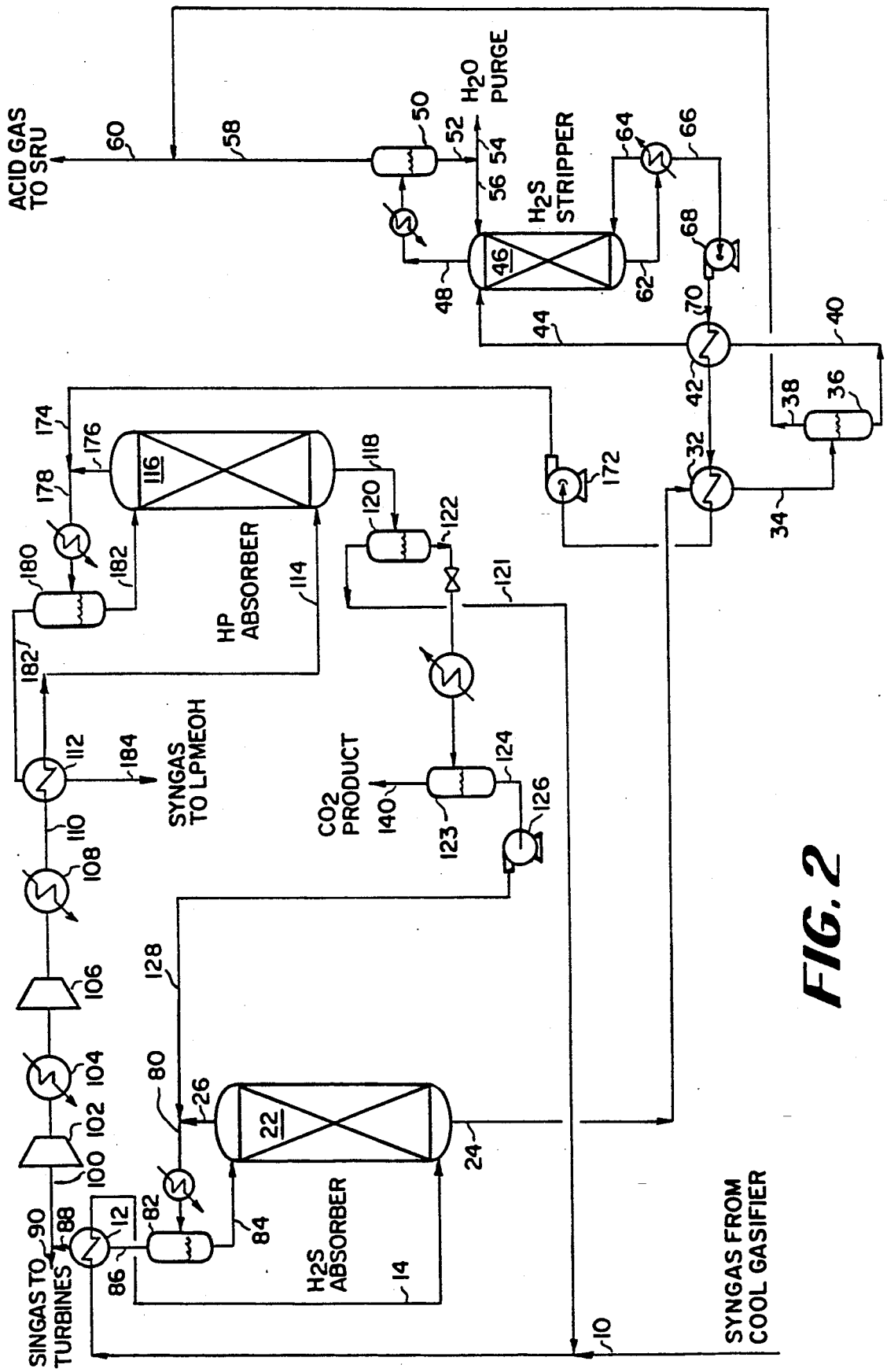
FIG. 2 is a schematic of an embodiment of the process of the present invention.

With reference to FIG. 2, streams and equipment which are similar to the process depicted in FIG. 1 are commonly numbered. The improvement of the present invention begins with the further processing of the acid gas-lean product stream, line 88. A portion (representing the quantity of syngas to be processed in the liquid fuels reactor) of the acid gas-lean syngas is removed, via line 100. (The remaining portion is sent to the turbines of the coal gasifier combined cycle, via line 90.) The portion, line 100, is compressed to the operating pressure of high pressure absorber 116 and aftercooled. This processing is accomplished in the process of FIG. 2 by the means of compressors 102 and 106 and heat exchangers 104 and 106. However, the number of compressors and heat exchangers used is immaterial. This high pressure, acid gas-lean syngas stream, line 110, is then cooled in heat exchanger 112 against warming, essentially sulfur containing compound-free syngas product and fed, via line 114 to high pressure absorber 116 wherein it is countercurrently contacted with absorbent to produce an essentially sulfur containing compound-free overhead at the top. The essentially sulfur containing compound-free overhead also has a greatly reduced concentration of carbon dioxide.

The essentially sulfur containing compound-free overhead is removed, via line 176 and combined with the high pressure regenerated absorbent, line 174. The high pressure regenerated absorbent is produced by pumping with pump 172, the regenerated absorbent, line 73. This combined stream, line 178, is cooled and phase separated in separator 180. The liquid is fed, via line 182, to the top of high pressure absorber 116 as the absorbent. The vapor portion is warmed in heat exchanger 112 and removed as an essentially sulfur containing compound-free syngas product, via line 184. This essentially sulfur containing compound-free syngas is suitable for reacting in the presence of a catalyst to produce liquid fuels such as methanol or other chemicals.

The absorbent at the bottom of high pressure absorber 116 is removed, via line 118 and phase separated in separator 120. The vapor overhead from separator 120 is removed via line 121 and recycled back to absorber 22. It would typically be combined with the syngas feed stream, line 10.

The liquid from separator 120, line 122, is flashed and optionally warmed to liberate dissolved carbon dioxide and then phase separated in separator 123. The overhead produced from the phase separation is removed, via line 140 and can be recovered as carbon dioxide product.

The liquid from separator 123, line 124, (the partially spent absorbent) is pumped to the operating pressure of absorber 22 with pump 126 and then fed to absorber 22, via line 128.

The improvement of the present invention is usable with most any acid gas removal process which uses a liquid absorbent.

In order to show the efficacy of the present invention, a computer simulation of the process schemes shown in FIGS. 1 and 2 have been run. For each simulation the flowrate of the absorbent was constant at 402 gallons per minute at 10° F.; the simulations were run using a mixture of dimethyl ethers of polyethylene glycol as the absorbent. Tables 1 and 2 show some properties of the feed and product streams of the process of FIGS. 1 and 2, respectively.

TABLE 1

| Stream Name (Stream Number) | Flowrates: moles/hr | | | $CO_2$ Conc.: mol % |
|---|---|---|---|---|
| | Total | $H_2S$ | COS | |
| Syngas Feed (10) | 9914.2 | 29.51 | 0.77 | 24.1 |
| Acid Gas-Lean Syngas (88) | 9368 | 0.22 | 0.39 | 20.3 |
| Acid Gases to SRU (60) | 540 | 29.29 | 0.38 | 90.5 |

TABLE 2

| Stream Name (Stream Number) | Flowrates: moles/hr | | | CO$_2$ Conc.: % |
|---|---|---|---|---|
| | Total | H$_2$S | COS | |
| Syngas Feed (10) | 9914.2 | 29.51 | 0.77 | 24.1 |
| Acid Gas-Lean Syngas (90) | 5034 | 0.11 | 0.34 | 25.6 |
| Acid Gas-Free Syngas (184) | 4171 | 0.001 | 0.007 | 11.2 |
| Acid Gas to SRU (60) | 549 | 29.39 | 0.40 | 90.6 |
| CO$_2$ Removal Stream (140) | 154 | 0.004 | 0.03 | 91.6 |

Table 3 lists the typical operating conditions for the absorbers of each process.

TABLE 3

| | FIG. 1 | FIG. 2 | |
|---|---|---|---|
| | Absorber 22 | Absorber 22 | Absorber 116 |
| Pressure: psia | 460 | 460 | 1200 |
| Temperature: °F. | 10 | 10 | 10 |

With reference to the improved process of FIG. 2, we see that the absorbent has been used twice in series. At the same solvent flow and theoretical trays required in FIG. 1, the improved process of FIG. 2 produces a sulfur containing compound-free syngas with a reduced carbon dioxide content. Surprisingly, the sulfur-contaminated absorbent being fed to first absorber 22, line 128, of FIG. 2 achieves an increase in overall sulfur recovery as well as a desulfurized methanol reaction feed gas. The overall sulfur recovery increases from 98.0 for the process of FIG. 1 to 98.38% for the process of FIG. 2; although this may not appear to be significant, this increase corresponds to about a twenty percent (20%) reduction in emissions. The sulfur recovered in the second absorber 116 more than compensates for decreased percent sulfur recovery in the first absorber 22 due to contaminated solvent because half of the sulfur in stream 88 is essentially recovered in absorber 116.

Note, also, that FIG. 2 shows the combined gas/liquid streams, line 178, being cooled to accommodate the carbon dioxide absorption exotherm, this cooling could be provided any place in tower 116.

Figure 3:
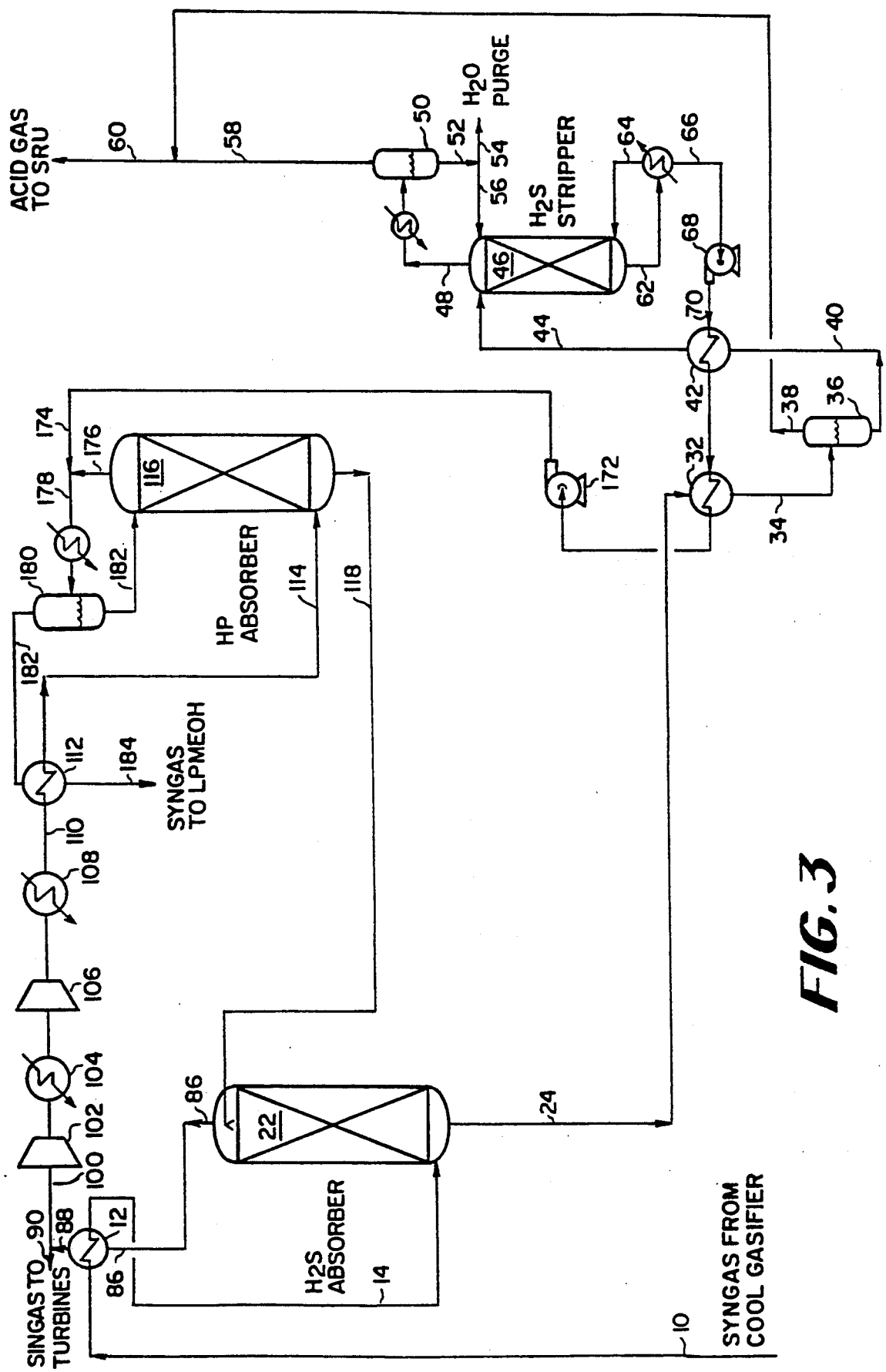
FIG. 3 is a schematic of a simplified and preferred embodiment of the present invention.

While the improved process of FIG. 2 beneficially recovers a carbon dioxide byproduct, a preferred embodiment, FIG. 3, is shown for use when a carbon dioxide byproduct is not desired. The process of FIG. 3 uses the partially spent absorbent from second absorber 116, line 118, as a carbon dioxide preloaded absorbent for first absorber 22; thus, eliminating the requirement of the cooler and separator 82 as well as intermediate vessels 120 and 123, pump 126 and the heater. To the extent that partially spent absorbent, line 118, is supersaturated with carbon dioxide, it will flash when fed into absorber 22 and beneficially refrigerate the absorbent.

Key to understanding this invention is in recognizing that with physical solvent absorbents, absorbent flow required to remove a given component with a fixed number of absorber trays is proportional to the component solubility and the amount of gas treated; it is independent of the amount of the component to be absorbed. Required absorbent flow is inversely proportional to absorber pressure. Also because solubilities increase as temperature is decreased, physical solvent absorption processes often are operated at refrigerated temperatures to minimize solvent flow.

In the embodiments of FIGS. 2 and 3, with 50% of the lean gas product 88 treated in the high pressure absorber 116, the normal solvent flow of 402 gallons per minute indicated when cooled to 10° F. will absorb 51% of the carbon dioxide and with 7 or more theoretical trays will absorb essentially all the hydrogen sulfide and the carbonyl sulfide. The net carbonyl sulfide absorption occurs in the high pressure absorber 116, as can be seen from the above tables.

It is important to note that at a given absorbent temperature, the fraction of the total feed that can be compressed and freed of sulfur containing compounds in high pressure absorber 116 without increasing the solvent flow will depend on the relative operating pressures of high pressure absorber 116 and hydrogen sulfide absorber 22. For example, at the 2.6 pressure ratio shown above, the fraction corresponds to about fifty percent (50%). For a pressure ratio of one (1), the fraction percentage would drop to about twenty percent (20%).

The present invention has been described with reference to two embodiments of the process of the present invention. These embodiments should not be viewed as a limitation on the scope of the present invention, the scope of which should be ascertained by the following claims.

We claim:

1. In a process for the removal of acid gases including carbon dioxide and the sulfur containing compounds hydrogen sulfide and carbonyl sulfide from a feed stream containing said acid gases, wherein the feed gas is cooled and countercurrently contacted with a liquid absorbent in an absorber tower thereby absorbing a first portion of the acid gases including carbon dioxide and the sulfur containing compounds hydrogen sulfide and carbonyl sulfide into the liquid absorbent to produce an acid gas-lean product gas at the top and spent absorbent at the bottom; wherein the spent absorbent is regenerated by distillation wherein dissolved acid gases are stripped from the spent absorbent thereby producing a regenerated liquid absorbent; the improvement for the production of a product which is essentially free of the sulfur containing compounds and has a reduced concentration of the carbon dioxide comprising the following steps:

(a) increasing the absolute pressure of at least a portion of the acid-gas lean product gas by at least 50% to an elevated pressure and cooling the resultant elevated pressure portion;

(b) countercurrently contacting the elevated pressure, cooled, acid gas-lean product gas portion of step (a) and the regenerated liquid absorbent in a second absorber, thereby absorbing a second portion of the acid gases including carbon dioxide and the sulfur containing compounds hydrogen sulfide and carbonyl sulfide into the regenerated liquid absorbent to produce the product, which is essentially free of the sulfur containing compounds and has a reduced concentration of the carbon dioxide, at the top of the second absorber and a partially spent absorbent at the bottom of the second absorber, wherein said second absorber is operated at the elevated pressure;

(c) recovering the product, which is essentially free of the sulfur containing compounds and has a reduced concentration of the carbon dioxide; and (d) using the partially spent absorbent as the absorbent to be contacted with the feed gas in the absorber tower.

2. The process of claim 1, which further comprises flashing the partially spent absorbent of step (b) to liberate dissolved carbon dioxide, and then phase separating the flashed partially spent absorbent to remove the liberated carbon dioxide, thereby leaving a low-carbon-dioxide-content, partially spent absorbent and using this low-carbon-dioxide-content, partially spent absorbent in step (d).

3. The process of claim 2 which further comprises phase separating the partially spent absorbent prior to flashing to remove any acid gas-lean syngas entrained in the partially spent absorbent and recycling the removed, acid-gas lean syngas to the absorber tower.

* * * * *